US011778131B1

(12) United States Patent
Mandavilli et al.

(10) Patent No.: US 11,778,131 B1
(45) Date of Patent: Oct. 3, 2023

(54) AUTOMATIC COMPOSITE CONTENT GENERATION

(71) Applicant: The Jemison Group, Inc., Houston, TX (US)

(72) Inventors: Raj Mandavilli, Houston, TX (US); Mae C. Jemison, Houston, TX (US); Megan Pouncy, Houston, TX (US)

(73) Assignee: The Jemison Group, Inc., Houston, TX (US)

( * ) Notice: Subject to any disclaimer, the term of this patent is extended or adjusted under 35 U.S.C. 154(b) by 0 days.

(21) Appl. No.: 16/599,040

(22) Filed: Oct. 10, 2019

Related U.S. Application Data

(60) Provisional application No. 62/745,303, filed on Oct. 13, 2018, provisional application No. 62/745,099, filed on Oct. 12, 2018, provisional application No. 62/744,559, filed on Oct. 11, 2018, provisional application No. 62/744,159, filed on Oct. 11, 2018.

(51) Int. Cl.
*H04N 5/265* (2006.01)
*H04N 5/272* (2006.01)
*H04N 23/90* (2023.01)
*H04N 23/63* (2023.01)
*H04M 1/02* (2006.01)

(52) U.S. Cl.
CPC ............ *H04N 5/265* (2013.01); *H04N 5/272* (2013.01); *H04N 23/632* (2023.01); *H04N 23/90* (2023.01); *H04M 1/0264* (2013.01)

(58) Field of Classification Search
CPC ...... H04N 5/2258; H04N 5/247; H04N 5/265; H04N 5/272; H04N 5/232933; H04N 5/232935; H04N 5/23293–232945; H04N 5/262; H04N 5/2621; H04N 5/2723; H04N 2005/2726
See application file for complete search history.

(56) References Cited

U.S. PATENT DOCUMENTS

| | | | |
|---|---|---|---|
| 2002/0075407 A1* | 6/2002 | Cohen-Solal | H04N 21/44008 348/565 |
| 2005/0036044 A1* | 2/2005 | Funakura | H04N 5/272 348/239 |
| 2006/0044396 A1* | 3/2006 | Miyashita | H04N 5/23203 348/207.99 |

(Continued)

*Primary Examiner* — Paul M Berardesca
(74) *Attorney, Agent, or Firm* — Fish & Richardson P.C.

(57) ABSTRACT

The present disclosure involves, systems, software, and computer-implemented methods for content generation. One example method comprises: generating, using a first camera, a plurality of images that represent a first scene-to-be-captured; providing, for display on a device, the plurality of images that represent the first scene-to-be-captured; receiving, at the device, a first input to capture a first scene; generating, using the first camera, a first image; generating, using a second camera on the device, a plurality of images that represent a second scene-to-be-captured; providing, for display on the device, the plurality of images that represent the second scene-to-be-captured; receiving, at the device, a second input to capture a second scene; generating, using the second camera, a second image; and generating a composite image comprising the first image and the second image, with at least a portion of the second image provided over at least a portion of the first image.

15 Claims, 11 Drawing Sheets

(56) References Cited

U.S. PATENT DOCUMENTS

| | | | | |
|---|---|---|---|---|
| 2009/0244296 | A1* | 10/2009 | Petrescu | H04N 5/23219 348/207.99 |
| 2010/0118175 | A1* | 5/2010 | Bruce | H04N 5/23293 348/333.05 |
| 2013/0120602 | A1* | 5/2013 | Huang | H04N 5/232935 348/218.1 |
| 2014/0240540 | A1* | 8/2014 | Kim | H04N 5/23219 348/231.99 |
| 2015/0009349 | A1* | 1/2015 | Kim | H04N 5/23229 348/218.1 |
| 2015/0049234 | A1* | 2/2015 | Jung | H04N 5/23218 348/333.05 |
| 2015/0124125 | A1* | 5/2015 | Kim | H04N 5/232933 348/239 |
| 2015/0207970 | A1* | 7/2015 | Min | H04N 5/23219 348/14.07 |
| 2016/0330383 | A1* | 11/2016 | Oyama | H04N 5/232939 |
| 2017/0034449 | A1* | 2/2017 | Eum | H04N 5/23238 |

* cited by examiner

AUTOMATIC COMPOSITE CONTENT GENERATION

CROSS REFERENCE TO RELATED APPLICATIONS

This application claims the benefit of U.S. provisional application Ser. No. 62/744,559, filed on Oct, 11, 2018; U.S. provisional application Ser. No. 62/744,159, filed on Oct. 11, 2018; U.S. provisional application Ser. No. 62/745,099, filed on Oct. 12, 2018; and U.S. provisional application Ser. No. 62/745,303, filed on Oct. 13, 2018, the entire contents of which are incorporated by reference as if disclosed herein in their entirety. This application is further related to co-pending and concurrently filed patent application Ser. No. 16/599,037, titled "Interactive Geospatial Environment for Shared Content," entire contents of which are incorporated by reference as if disclosed herein in its entirety.

BACKGROUND

Mobile devices often include a camera. A mobile device user can use an application on the mobile device that interfaces with the camera and allows the user to capture photographs. Captured photographs can be stored on the mobile device. For example, the mobile device can include an image gallery application that allows a user to view previously-generated photographs.

SUMMARY

The present disclosure involves systems, software, and computer-implemented methods for content generation. An example computer-implemented method comprises: generating, using a first camera on a mobile device, a plurality of images that represent a first scene-to-be-captured; providing, for display on the mobile device, the plurality of images that represent the first scene-to-be-captured; receiving, at the mobile device, a first input to capture a first scene; generating, using the first camera, a first image; after capturing the first image, generating, using a second camera on the mobile device, a plurality of images that represent a second scene-to-be-captured; providing, for display on the mobile device, the plurality of images that represent the second scene-to-be-captured; receiving, at the mobile device, a second input to capture a second scene; generating, using the second camera, a second image; and generating a composite image comprising the first image and the second image, wherein at least a portion of the second image is provided over at least a portion of the first image.

In some implementations, the first camera and the second camera are positioned on the mobile device to face opposite directions. In some implementations, the first camera is rear-facing. In some implementations, the second camera is front-facing.

In some implementations, the composite image includes the second image provided within the first image.

In some implementations, the composite image is automatically generated without user input after capturing the second image.

In some implementations, generating the composite image comprises: automatically determining a size of the second image; automatically determining a location for the second image on the first image; sizing the second image according to the determined size; and placing the sized second image at the determined location on the first image.

In some implementations, generating the composite image further comprises cropping the second image. In some implementations, cropping the second image comprises cropping the second image into a predetermined shape.

Another example computer-implemented method comprises: providing, for display in a graphical user interface in an application running on a computing device, a plurality of options of media formats for selection by a user of the computing device, wherein the plurality of options of media formats for selection comprises a composite photo; receiving, by the application and from the user of the computing device, an input indicating a selection of a media format among the plurality of options of media formats; generating, by the application, media content in the selected media format; providing, by the application, the generated media content for user review; receiving, by the application, an indication that the generated media content is acceptable; and storing, by the application, the generated media content in a memory of the computing device, wherein the memory is associated with the application.

In some implementations, the method comprises receiving, by the application and from the user of the computing device, an indication to share the generated media content with one or more other applications running on the computing device.

In some implementations, the method comprises receiving, by the application and from the user of the computing device, an indication to store the generated media content in a particular content gallery.

In some implementations, the plurality of options of media formats for selection further comprise photo, video, audio, and text.

In some implementations, the method comprises, in response to an indication that the generated media content is not acceptable, deleting the generated media content.

In some implementations, the method comprises: after deleting the generated media content, prompting the user to select a second media format among the plurality of options of media formats; and generating a second media content in the selected second media format.

The technical solutions described herein provide a number of benefits to users who use a mobile application to generate content. For example, the content generation application described herein provides functionality to automatically switch from a first camera (e.g., a rear facing camera) to a second camera (e.g., a front facing camera) in order to generate images, in succession, for the purpose of creating composite content. The content generation application described herein further allows for the second image to be automatically positioned within or partially overlapping the first image without the need to restart a camera function, leave the application, or retrieve content from a gallery that is external to the application. The content generation application described herein provides for saving or sharing of generated content through email, text message, or other software applications.

The content generation application described herein provides several technical advantages. For instance, use of a composite content application to generate composite content can eliminate a need to restart a camera function, manually engage different cameras, and/or manually retrieve content, which can result in composite content being created in less time than for applications that require content retrieval from a gallery and/or manual engagement of different cameras. Accordingly, battery life of a mobile device can be improved, and processing time can be reduced, since a user can create composite content in less time. Additionally, device wear can be reduced, due to less user inputs (e.g., less touch inputs) on a screen and/or physical buttons that may otherwise be required if a user has to manually engage different cameras or manually retrieve content.

Additionally, device disk usage can be reduced because the composite content application can enable the user to decide, within the composite content application, whether to save generated content items or composite content, at an end of a composite content generation process. Other applications, in contrast, may require a user to first save items to a gallery that is external to the application, and then retrieve, for example for a collage, content from the external gallery that had been previously generated. For at least some users, content may be left in the gallery, using device storage, even if those content items are never subsequently used for a collage.

As other examples, a single-page content creation interface can eliminate a need for users to switch applications or to change pages within an application in order to create content in multiple media formats including, for example, audio, video, image, text and composite content (e.g., image within image). Battery performance can be improved, since a user can create content of multiple, different types in less time using the single-page interface, as compared to switching to multiple types of applications or application interfaces to create the multiple, different types of content. Device wear can be reduced, and user satisfaction can be improved, due to less user inputs required for creating multiple types of content.

Additionally, content of various types created from a single page interface can be stored in a single multimedia gallery. Device management can be improved since maintenance of a single multimedia gallery is generally more efficient than maintenance of multiple, different galleries for different types of content that are generated by separate applications.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
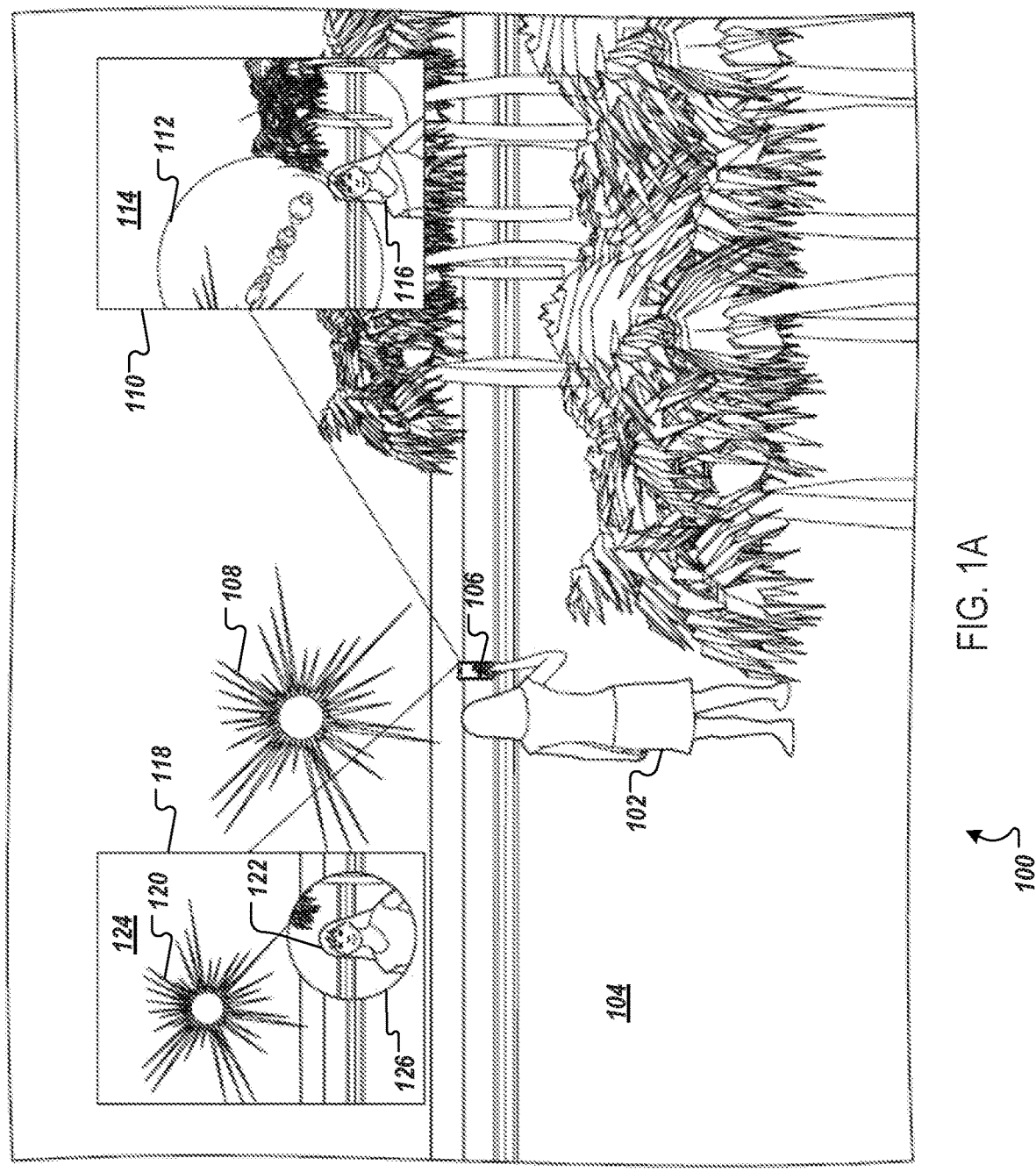
FIGS. 1A and 1B are examples of conceptual diagrams that illustrate generation of composite content.

In general, this document describes mechanisms for generating content on computing devices. Currently, some mobile device applications may enable a user to create a collaged image. An application may require that the user access a gallery that is external to the application to retrieve respective images that are to be used for the collage. If the user wishes to include images captured with different cameras (e.g., front-facing, rear-facing), the application may require that the user engage each camera separately, then later retrieve those images captured with different cameras, for assembly into a collage. These applications may require that the user manually engage each camera and leave the application in order to select previously-generated images.

Presented herein are methods for an improved user experience and improved device efficiency when generating content. For example, a content generation application can include a composite content generator that provides a user a capability to automatically generate an image with a mobile device and immediately generate a second image with the mobile device to incorporate the second image and the first image into a composite content item (e.g., a composite image), without restarting a camera function or retrieving content from a gallery that is external to the application. The user can position the second image, within the first image, without leaving a composite content generation interface. The composite content can be saved and/or shared.

Use of the composite content generator can eliminate a need to manually switch, for example, from a rear facing camera to a front facing camera while taking images in succession. As another example, the composite content generator can eliminate a need to leave the application in order to create composite content from multiple content items. Composite content can include multiple content item types, including images, video, text, and audio, for example. Eliminating a need to leave the application, retrieve content from an external gallery, and manually engage different cameras can save battery life, processing time, and disk usage, as described above.

The composite content generator can be included in the content generation application in a single-page interface that also allows for creation of other types of content. The single-page interface can allow a user to generate and share content in multiple formats on a single page of the content generation application. For instance, a user may, by using the single-page interface, generate image content, video content, audio content, text content, and composite content (that includes multiple content items), all without switching to a different interface. The single-page interface can consolidate and provide access to multiple content-generation functions that are resident on a computing device, on a single application page. The user can use the single-page interface to create multiple types of content, without having to switch to different applications or different user interfaces.

Turning to the illustrated example implementation, FIG. 1A is an example of a conceptual diagram 100 that illustrates generation of composite content. A user 102 standing on a beach 104 would like to take a picture, using a mobile device 106, of a setting sun 108 over the water. The user 102 may wish to include himself or herself in the captured image. The user 102 can use a front-facing camera, for example, on the mobile device 106, to take a picture of both himself or herself and the setting sun 108, as shown in an example mobile device display 110. However, glare 112 from the setting sun 108 may make a captured image 114 have a quality that is less than desirable. For example, certain camera lighting settings that may make for an acceptable capture of the setting sun 108 may result in an unacceptable (e.g., too dark) capture of the user 102. As another example, other camera lighting settings that may make for acceptable capture of the user 102 (e.g., as shown by a user 116 in the captured image 114) may result in a less than desirable capture of the setting sun 108.

As another example, the user 102 can use a composite content application on the mobile device 106 that enables a composite image to be captured. For instance, as shown in a mobile device display 118, the user 102 can capture a first image 120, of the setting sun 108, using, for instance, a rear-facing camera, using camera lighting settings that are most appropriate for capturing the sunset. The composite content application can, after the first image 120 is captured, automatically engage a second camera, such as a front-facing camera, that enables the user 102 to capture a second image 122, of himself or herself (e.g., a "selfie"). A composite image 124 can be generated (and displayed in the composite content application) that includes the first image 120 and the second image 122 placed at least partially over the first image 120. For instance, the second image 122 is placed in a circular frame 126 in this example.

The composite image 124 can be generated, without the user 102 having to leave the composite content application. For instance, the user 102 does not need to select the first image 120 from a gallery, in order to combine the second image 122 with the first image 120. The user 102 also does not need to engage the second camera. Rather, the composite content application automatically engages the second camera, for the user 102, after the first image 120 is captured.

Figure 1B:
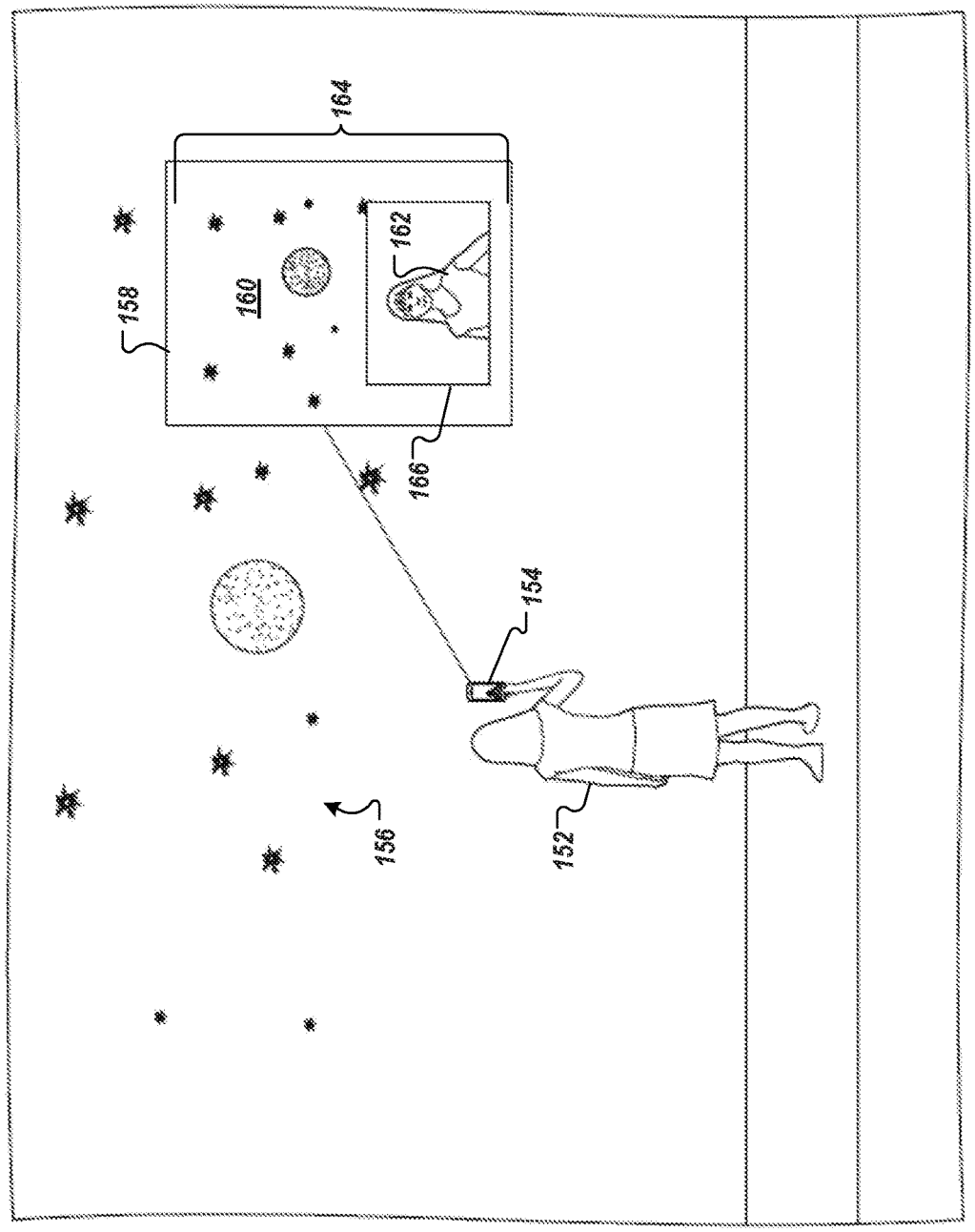

FIG. 1B is another example of a conceptual diagram 150 that illustrates generation of composite content. A user 152 can use a composite content application on a mobile device 154 to create a composite image that includes an image of a night sky 156. For instance, as shown in a mobile device display 158, the user 152 can use the composite content application to capture a first image 160, of the night sky 156, using, for instance, a rear-facing camera, using camera lighting settings that are most appropriate for capturing the night sky 156. The composite content application can, after the first image 160 is captured, automatically engage a second camera, such as a front-facing camera, that enables the user 152 to capture a second image 162, of himself or herself (e.g., a "selfie"), using camera lighting settings (e.g., a flash) that are most suited for capturing the second image 162 of the user 152. A composite image 164 can be generated (and displayed in the composite content application) that includes the first image 160 and the second image 162 placed at least partially over the first image 160.

For instance, the second image 162 is placed in a rectangular frame 166 in this example. A user may select a frame shape or size preference (e.g., prior to or during generation of the composite image 164), and/or the composite content application can determine a frame shape (and/or size) for the second image 162 that best fits in combination with the first image 160. Other variations and examples are discussed below.

Figure 2:
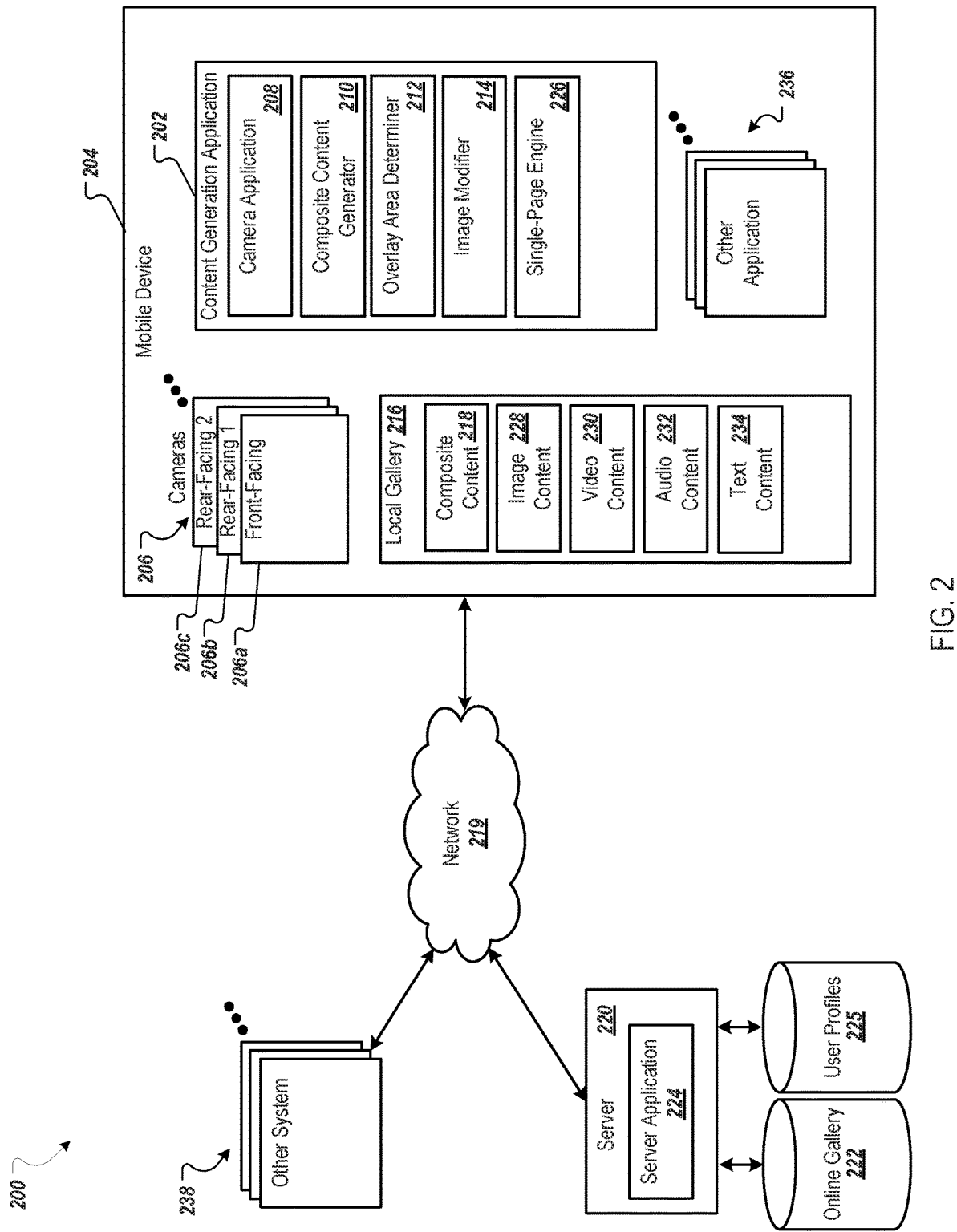
FIG. 2 is a block diagram that illustrates an example of a system that provides generation of composite content.

FIG. 2 is a block diagram that illustrates an example of a system 200 that provides content generation. A content generation application 202 runs on a computing device 204. The computing device 204 can be, for example, a mobile device, such as a mobile phone or a tablet. Other types of computing devices can be used, such as a smart television, a laptop computer, or any device that supports image capture. For instance, the computing device 204 includes a plurality of cameras 206. The plurality of cameras 206 can include different types of cameras, such as front-facing or rear-facing cameras. The plurality of cameras 206 includes, for example, a front-facing camera 206a, a first rear-facing camera 206b, and a second rear-facing camera 206c.

The content generation application 202 can include (or access) a camera application 208 that can interface with the plurality of cameras 206, to enable the user to view a scene-to-be captured (e.g., a camera live view of a respective camera 206a, 206b, or 206c) and provide a user input that causes the respective camera 206a, 206b, or 206c to generate an image. For instance, the content generation application 202 can include a composite content feature that enables a user to create a "photo-in-photo" content item.

The content generation application 202 can use the camera application 208 to generate, using a first camera (e.g., the camera 206b), a plurality of images that represent a first scene-to-be-captured. For instance, the camera application 208 can display a "live view" of images that are being captured by the camera 206b. The content generation application 202 (or more specifically the camera application 208) can receive a first input to capture a first scene. In response to the first input, the camera application 208 can generate a first image captured by the first camera (e.g., the camera 206b).

After capturing the first image, the content generation application 202 can use the camera application 208 to automatically engage a second camera (e.g., the camera 206a). Once the second camera is engaged, the camera application 208 can generate, using the second camera, a plurality of images that represent a second scene-to-be-captured, and display the plurality of images (e.g., as a live view of images that are being captured by the second camera).

The content generation application 202 (or the camera application 208) can receive a second input to capture a second scene. In response to the second input, the camera application 208 can generate a second image captured by the second camera (e.g., the camera 206a).

After the second image has been captured, a composite content generator 210 can generate a composite image that includes the first image and the second image, with at least a portion of the second image being provided (e.g., overlaid) over at least a portion of the first image. The composite content generator 210 can create the composite image by using the first image as a background image and the second image as a foreground image, for example.

The composite content generator 210 can use an overlay area determiner 212 to determine a size of the second image in the composite image and a location of the second image, which can include determining how much of the second image is to overlay the first image. In some implementations, the overlay area determiner 212 determines a shape size to use for the second image. For instance, the second image can be displayed in the composite image within a shape frame of a particular shape type (e.g., circle, oval). Further details for determining a shape frame, an overlay area, and a size and location of the second image are described below with respect to FIG. 4.

An image modifier 214 can be used by the composite content generator 208, such as to crop the second image into a shape and/or size determined by the overlay area determiner 212. In some implementations, the image modifier 212 applies filters or special effects that may be configured by or selected by the user.

The content generation application can save the generated composite image to a local gallery 216 (e.g., as saved composite content 218). As another example, the content generation application 202 can upload composite content, over a network 219, to a server 220, for storage in an online gallery 222. In some implementations, the server 220 runs a server application 224 which can, for example, handle upload requests for the online gallery 222, login requests for the content generation application 202, and other features. In some implementations, the server application 224 enables retrieval and review (and other operations) of content stored in the online gallery 222. In some implementations, the server application 224 manages user profiles in a user profiles repository 225 that may be used for storing user credentials, user preferences, etc. The content generation application 202 may receive, from the server 224, user preferences from the user profiles repository 225 for a successfully logged-in user, for example.

In some implementations, the content generation application 202 includes a single-page engine 226 that generates and provides a single page interface for content creation in multiple formats. The multiple formats can include composite content generated by the composite content generator 210. Other content, including image content 228, video content 230, audio content 232, and text content 234 can be generated by a user using the single-page interface provided by the single-page engine 226 (and stored in the local gallery 216 and/or the online gallery 222).

The single-page engine 226 can provide, in the single-page interface, a menu with various options for content creation in multiple formats. The single-page engine 226 can receive, through the single-page interface and from the user, an input to create content in a particular format. The single-page engine 226 can update the single-page interface to enable the user to create content in the selected format, without the user having to leave the single-page interface. The single-page engine 226 can update the single-page interface to enable the user to review, accept, save, share, or discard the content.

For instance, composite content and other content generated by the content generation application 202 can be shared with other applications. For instance, the content generation application 202 can share content with other applications 236 that are running (or installed) on the computing device 204. As another example, content generated by the content generation application 202 can be shared, over the network 219, with one or more other systems 238 (e.g., by the content generation application 202 or by one of the other applications 236).

Figure 3:
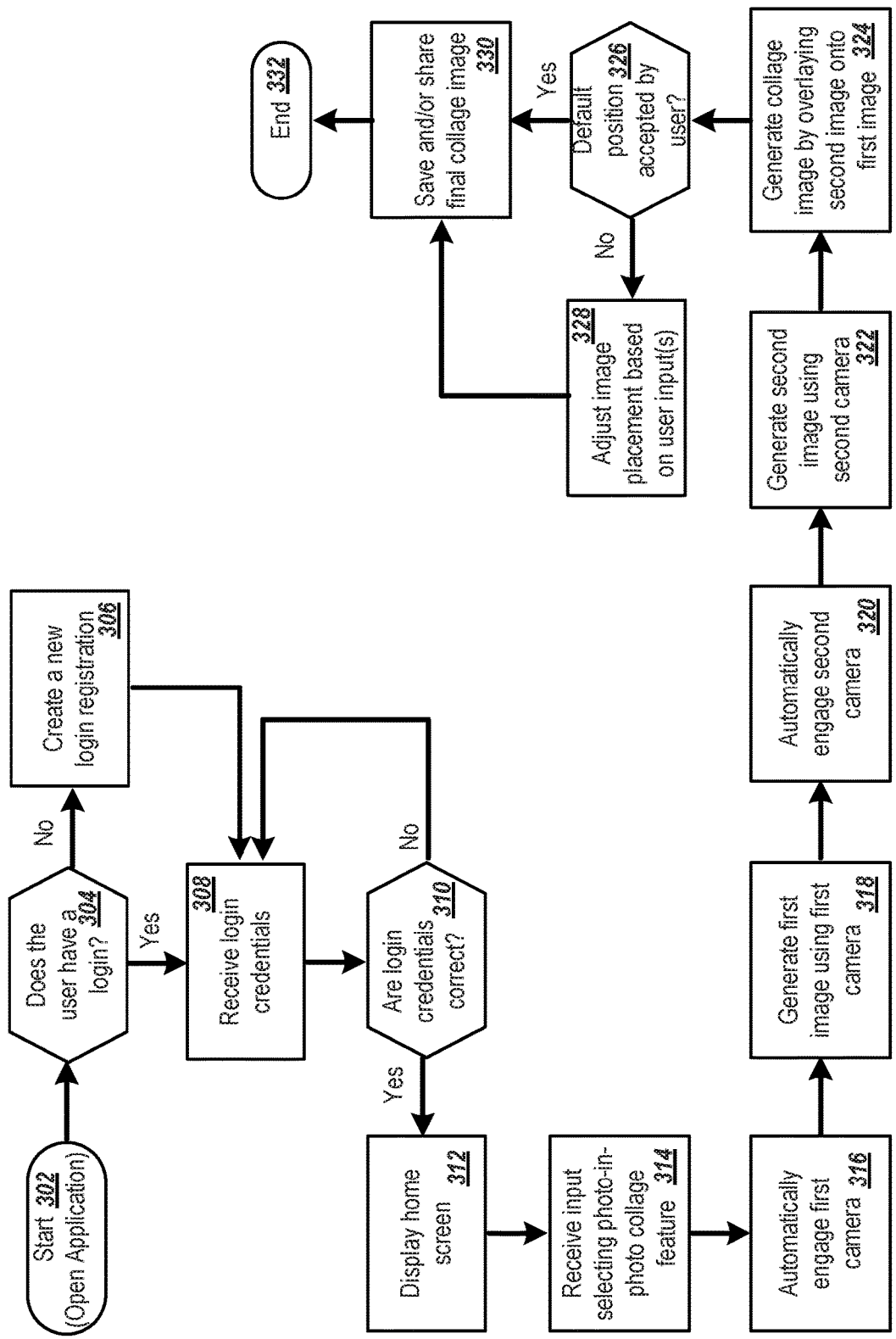
FIG. 3 is a flow chart of a method for generation of composite content.

FIG. 3 is a flow chart of a method 300 for generating composite content. At step 302, the process 300 is started, for example, when a user opens an application. For example, the user 102 can open the composite content application on the mobile device 106.

At step 304, a determination is made as to whether the user has a login. For example, the user 102 indicates that he or she does not have a login by selecting a "sign up" link or similar item on a login user interface displayed on the mobile device 106. At step 306, a new login registration can be created for the user. As another example, the user may indicate that he or she does not have a login by selecting a login link, or by entering credentials on the login user interface. At step 308, login credentials are received (e.g., either credentials associated with the login registration created at step 306 or credentials previously established with an earlier login registration. At step 310, a determination is made as to whether the received login credentials are valid. If the received login credentials are not valid, the user may reattempt a login, and updated login credentials can be received (e.g., at 308), and a re-determination of whether the updated login credentials are correct can be performed.

At step 312, in response to determining that the received login credentials are correct, a home screen of the application is displayed. For example, a home screen of the composite content application is displayed on the mobile device 106. The home screen can include selectable user interface items, including an option for creating composite content. For instance, an option can be displayed for creating a photo-in-photo collage feature. At step 314, an input selecting the photo-in-photo collage feature is received.

At step 316, a first camera is automatically engaged. The first camera can be, for example, a rear-facing camera or a front-facing camera. For example, a rear-facing camera of the mobile device 106 is engaged. Which camera to automatically engage when the photo-in-photo collage feature is selected can be preconfigured (e.g., a rear-facing camera can be engaged). As another example, a user preference setting can be automatically retrieved and used to determine which camera to engage. As another example, selectable options that enable a user to select which camera to engage can be presented, and a selection of a particular option that indicates a particular camera can be received.

At step 318, a first image is generated using the first camera. For instance, the user can select a user interface option to capture the first image. For example, the user 102 selects a capture button on the mobile device 106 to capture the first image 120 using the rear facing camera of the mobile device 106. Before the first image is generated, a plurality of images that represent a first scene-to-be-captured can be generated and displayed in the application, e.g., to display to the user what the first camera is capturing in a live view mode.

At step 320, a second camera is automatically engaged. The second camera can be, for example, a front-facing camera. For example, a front-facing camera on the mobile device 106 is automatically engaged. Which camera to automatically engage after the first image is generated can be preconfigured (e.g., a front-facing camera can be engaged, after the first image has been captured with a rear-facing camera, with an order of the front-facing camera being engaged after the rear-facing camera preconfigured in the application). As another example, a user preference setting can be automatically retrieved and used to determine which camera to engage.

In some implementations, which camera to engage after the first image has been generated can be determined based on which camera was used to generate the first image. For instance, if the mobile device has two cameras, and a first camera (e.g., a rear-facing camera) is engaged to create the first image, the application can automatically determine to engage the second (e.g., the other) camera, after the first image has been generated. As another example, if the first image is generated with a front-facing camera, the application can automatically engage a rear-facing camera, after the first image has been generated. As yet another example, selectable options that enable a user to select which camera to engage can be presented, and a selection of a particular option that indicates a particular camera can be received. Although scenarios involving two different cameras are discussed, in some implementations, the photo-in-photo collage can include multiple photos taken using a same camera. For instance, the user may select, for capturing a second image, a same camera that was used to capture the first image.

At step 322, a second image is generated using the second camera. For instance, the user 102 selects a user interface option to capture the second image 122 using the front-facing camera of the mobile device 106. Before the second image is generated, a plurality of images that represent a second scene-to-be-captured can be generated and displayed in the application, e.g., to display to the user what the second camera is capturing in a live view mode.

At step 324, a collage image is generated by overlaying the second image onto the first image. For example, the composite content application running on the mobile device 106 generates the composite image 124. Overlaying the second image onto the first image can include including, in the collage image, at least a portion of the second image over at least a portion of the first image.

At step 326, a determination is made as to whether a default position of the second image on the first image is accepted by the user. For example, a determination can be made that the default position is not acceptable based on receiving one or more user inputs for moving the second image to a different position. For example, the user 102 selects the second image 122 and performs a drag input.

At step 328, the collage image is adjusted by moving the second image to the different position based on the received user input(s) for moving the second image to the different position. For example, the second image 122 is moved to a new location in response to the drag input.

At step 330, a final collage image is saved and/or shared. For instance, the user can select a save and/or a share user input item. For example, the user 102 can select a save button to save the composite image 124. Selection of the save or share input item without moving the second image can be a determination that the user accepts the default position of the second image, for example. At step 332, the process 300 ends.

Figure 4:
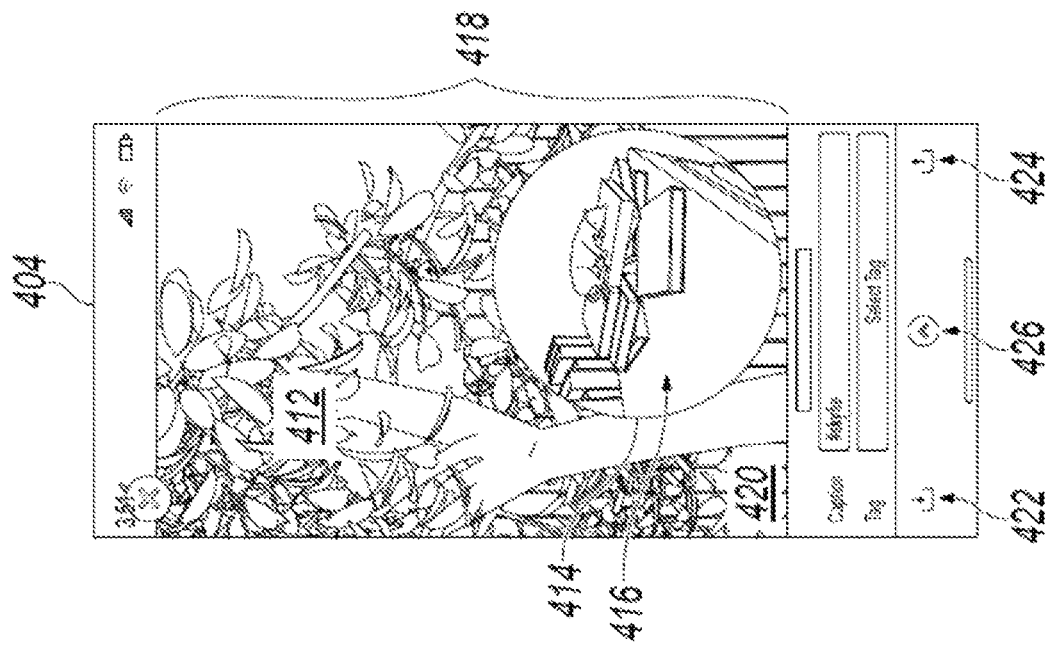
FIG. 4 illustrates examples of user interfaces for generating composite content.
Figure 4:
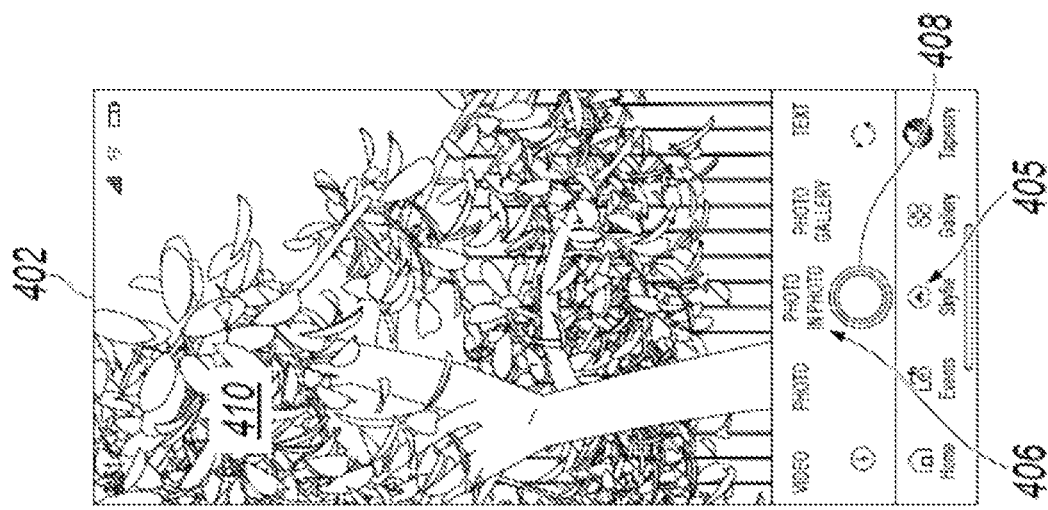

FIG. 4 illustrates examples of user interfaces 402 and 404 for generating composite content. The user interface 402 can be displayed, for example, on a mobile device that includes at least two cameras. For instance, the mobile device can include a rear-facing camera and a front-facing camera. The user interface 402 can be displayed in response to user selection of an option 405. After the user interface 402 has been displayed, the user can select a photo-in-photo option 406 to initiate a composite content feature.

In response to selection of the photo-in-photo option 406, the mobile device can generate, using a first camera, a first plurality of images that represent a first scene-to-be-captured, and provide the first plurality of images, for display on the user interface 402. The display of the first plurality of images can provide a live view of images currently being captured by the first camera. The user can position the mobile device so that the first camera is capturing a scene that the user wishes to capture and select a capture button 408, to cause the mobile device to generate a first image using the first camera. For instance, the first image can be a capture of a scene 410.

In response to the generation of the first image, the first image can be displayed, for example, as a background image, as shown by a first image 412 that is displayed in the user interface 404. The mobile device can automatically switch to and engage a second camera (e.g., a front-facing camera) and generate, using the second camera, a second plurality of images that represent a second scene-to-be-captured, and provide the second plurality of images, for display on the user interface 404. The display of the second plurality of images can provide a live view of images currently being captured by the second camera, for example.

In some implementations, the second plurality of images are displayed at least partially on top of the first image 412. For instance, the second plurality of images can be displayed within a shape frame 414. Although the shape frame 414 is displayed as a circle, other types of shape frames can be used, such as ovals, rectangles, triangles, squares, free-form shapes, etc. In some implementations, panoramic frames can be used.

The user can position the mobile device so that the second camera is capturing a scene that the user wishes to capture. The user can select a capture button (e.g., similar to the capture button 408) to cause the mobile device to generate a second image using the second camera. For instance, a second image 416 is displayed in the shape frame 414.

In response to the user selecting the capture button to generate the second image 416, the application can automatically generate, without user input, a composite image 418 that includes the first image 412 and the second image 416. The composite image 418 can be generated without the user having to select the first image 412 (or to leave the application to select or retrieve an image from a gallery that is external to the application). In the composite image 418, at least a portion of the second image 416 can be provided over at least a portion of the first image 412. For instance, the second image 416 can be provided within the first image 412, or can partially overlay the first image 412.

The application can crop the second image 416 to fit inside the shape frame 414. As mentioned, various types of shape frames are possible. In some implementations, a default type of shape frame (e.g., a circle) is preconfigured and used. As another example, a user can configure a preference for a shape frame type and the user preference can be retrieved, to determine a type of shape frame to use to enclose the second image 416. As yet another example, the user can be presented, before the composite image 418 is generated, with a list of supported shape frame types, and the user can select a particular shape frame type.

In addition to a shape frame type, a size and a position of the shape frame 414 (or the second image 416) can also be determined. For instance, one or both of a shape frame size and position can be predetermined. For instance, a default size for the shape frame 414 may be a radius of 200 pixels and a default position may be a lower right corner of the first image 412. As another example, a user can configure a preference for one or both of a shape frame size or shape frame location, and the user preference(s) can be retrieved, to determine an initial shape frame size and position for the shape frame 414.

In some implementations, some or all of a shape frame type, a shape frame size, or a shape frame location (or a size, shape or location of the second image 416) can be determined based on analyzing the first image 412. For instance, an area within the first image 412 can be automatically determined as an overlay area in which at least a portion of the second image is to be provided, in the composite image 418. An overlay area can be automatically selected from candidate areas that are determined based on analyzing the first image 412. As another example, indications (e.g., outlines) of candidate areas can be displayed on the user interface 404, and a user can select a particular candidate area as an overlay area.

As examples of automatic selection of candidate areas, whitespace or other areas of the first image 412 that are uniform in color (or uniform to at least a certain percent), or that are most uniform within the first image 412, can be identified as candidate areas for the second image 416 to overlay the first image. If multiple candidate areas are identified, each candidate area can be ranked, and a particular candidate area can be selected as the overlay area.

Candidate areas can be ranked by suitability for use as an overlay area. Suitability can be based on size of the candidate area (e.g., with larger candidate areas being ranked higher than smaller candidate areas, or areas that are closest in size to a desired predetermined size being ranked higher than other candidate areas). Candidate areas can be ranked on other factors, such as a degree of color uniformity (e.g., with color uniformity indicating how much a candidate area may be an "open space" on the first image). Color uniformity (or similarity) may indicate an area with a lack of detail (e.g., where areas with a higher degree of color variability may indicate detailed areas of the first image that may be deemed as less suitable for an overlay area). Color uniformity can be one measure of identifying "open" or otherwise suitable locations. Other measures can be used. For instance, an area with a repeating pattern can be identified, and a portion of the repeating pattern area can be selected as a candidate area, since hiding (by overlaying) some of the repeating pattern area may be deemed as suitable since the user can still see the remaining portions of the repeating pattern area. For instance, a repeating pattern of a fence 420 can be identified, and an area within the fence 420 can be selected as a candidate (or overlay) area.

A location of a shape frame, or a location within the first image 412 where at least a portion of the second image 416 is to be provided, can be determined based on the chosen overlay area. For instance, analysis of the first image 412 may indicate that whitespace, or generally "open space" within the first image 412 is substantially located within the first image in an upper right corner, and accordingly, an overlay position for the second image 416 can be determined to be the upper right corner of the first image 412.

As other examples, shape frame and/or overlay characteristics can be determined based on characteristics of a selected overlay area. For example, a shape frame size, or an overlay portion size, can be selected based on a size of the chosen overlay area. For instance, a whitespace or otherwise uniform area of a particular width and height (e.g., 100 pixels by 200 pixels) can be identified, and a shape frame of a same or similar size can be selected, for inclusion of the second image 416.

A shape frame type can be selected based on an overall type of a selected overlay area. For example, if the overlay area is generally more like a rectangle than a circle, a rectangle shape frame can be selected. If the overlay area is generally more (or most) like a circle, a circle shape frame can be selected.

In some implementations, the user can change an initially displayed shape frame from a first type (e.g., a circle) to a second type (e.g., a square), such as by selecting the shape frame 414 and choosing a different shape type from a list of supported shape types. If the user changes a shape frame type, the application can re-crop or adjust the second image 416 to fit within the new shape frame type. For instance, the application can generate and store a rectangular version of the second image 416, and can use the rectangular version if the shape frame type is rectangular, or can crop the rectangular version to another shape if the shape frame is (or becomes) a different type of shape. In some implementations, the user can change characteristics of the shape frame, such as a border color, size, or line style, or other characteristics.

In some implementations, the user can move the shape frame 414 from a default position to a new position, within the composite image 418. For example, the user can select the shape frame 414 (or the second image 416), and provide one or more user inputs (e.g., touch inputs, keyboard inputs), to move the shape frame 414 to a different location.

In some implementations, the user can change a size of the shape frame 414 from a default size to a new size. For instance, the user can select the shape frame 414 and provide one or more user inputs to resize the shape frame 414. In some implementations, the user can change the size of the composite image 418 and/or the size of the first image 412 within the composite image 418. Resizing of the composite image 418 can result in automatic resizing of the first image 412. In some implementations, the application reanalyzes the first image 412 upon a change in size of the first image 412, which can result in an updated shape frame type, size, or location (or updated size or location of the second image 416).

In some implementations, special effects and/or filters can be applied to the composite image 418, the first image 412 within the composite image 418, or the second image 416 within the composite image 418. That is, an effect or filter can be applied to the composite image 418 as a whole (e.g., affecting both the first image 412 and the second image 416 within the composite image 418), or an affect or filter can be applied separately to either the first image 412 or the second image 416 within the composite image 418, without affecting the other image area within the composite image 418.

In some implementations, the application may enable the user, before and/or after generation of the composite image 418, to swap placement (e.g., foreground/background roles) of the first image 412 and the second image 416. That is, the user can designate that the second image 416 is to be a background image and the first image 412 is to be a foreground image that at least partially overlays the second image 416. In response to a placement swap request, the second image 416 can be expanded in size to be a background image, and the first image 412 can be cropped to be a smaller foreground image. A shape frame type, size, and location for the first image 412 can be determined, based on user inputs or automatically, as described above (e.g., based on analysis of the second image 416 as a background image). In some implementations, a swap option functions as a toggle in that the user can switch back and forth between the first image 412 or the second image 416 being a background image.

Although image capture of two images is discussed, other content options are possible. For example, more than two images can be used. For instance, a first image can be generated as a background image, and second, third, fourth images, etc., can be generated as foreground images. Background and foreground images can be generated using a variety of cameras. Some devices can include more than two cameras, and for such devices, three or more images can be captured, each with potentially different cameras. Each stage of image capture can include selection of a particular camera (e.g., based on user input, pre-configurations, or automatic analysis of current context conditions).

Although composite images are described, composite content can include non-image content. For instance, composite content can include video content. For instance, a background content item may be a video captured with a rear-facing camera and a foreground content item may be an image (or a video) captured with a front-facing camera. As another example, a background content item may be an image captured with a rear-facing camera and a foreground content item may be a video captured with a front-facing camera. When multiple content items are captured, a second camera can be automatically engaged, as described above, but can be engaged to capture video, if the second content item is a video content item. As with image generation, more than two cameras and more than two videos can be generated, for use in composite content. Composite content can include other types of content, such as text or audio.

After a composite content item is generated, the composite content item can be saved (e.g., to a local gallery on the mobile device) in response to selection of a save item 422. As another example, the generated content item can be shared, with one or more applications on the mobile device, in response to selection of a share item 424. As yet another example, the generated composite content item can be uploaded (e.g., to an online gallery or online community), in response to selection of an upload item 426.

Figure 5:
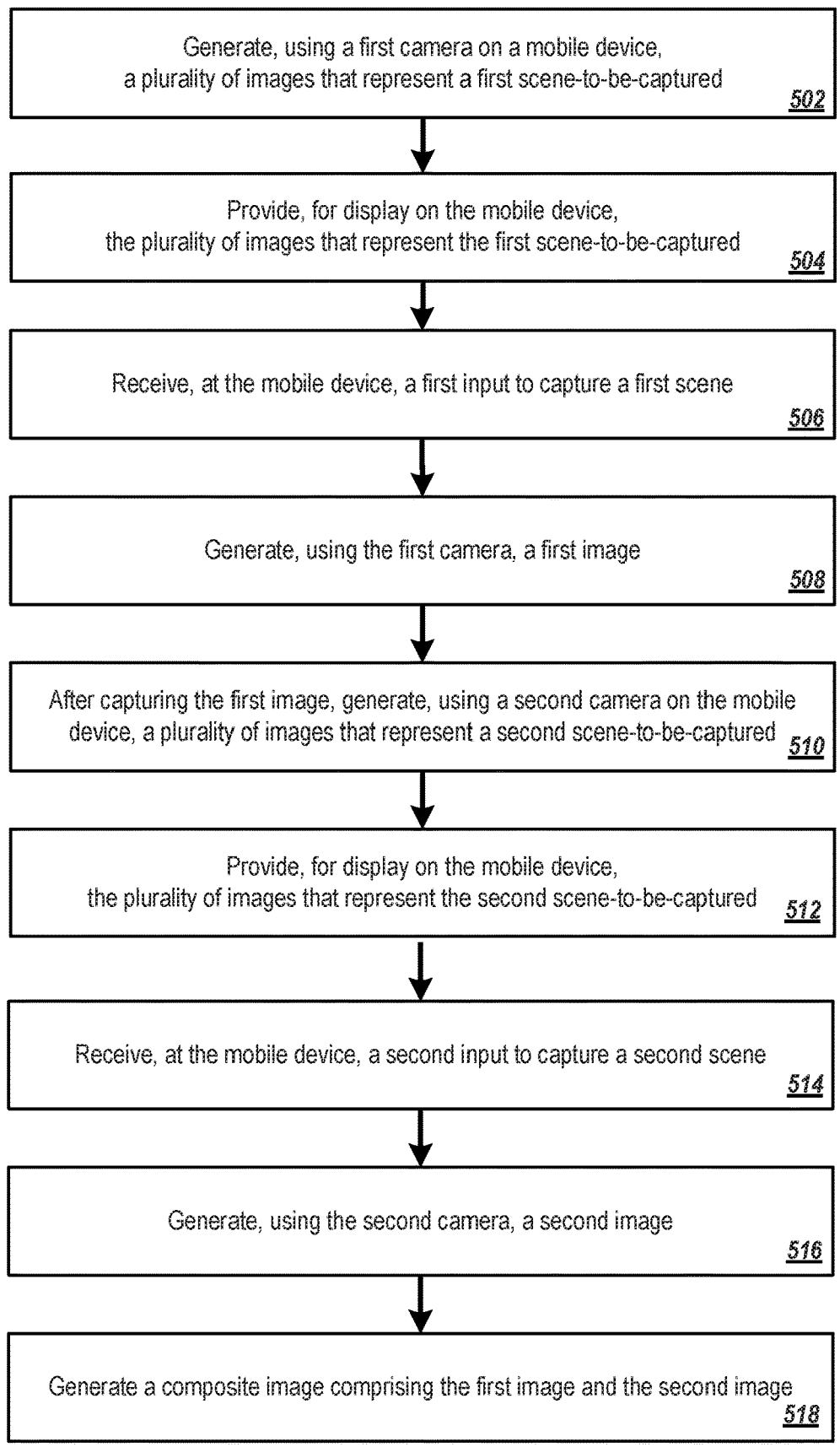
FIG. 5 is a flow chart of a method for generation of composite content.

FIG. 5 is a flow chart of a method 500 for generating composite content. For example, the process 500 may be used by the system 200 shown in FIG. 2 or some other system. The method 500 can be performed by a computing device, such as a mobile device. The mobile device can include multiple cameras, including a first camera and a second camera. The first camera and the second camera can be positioned on the mobile device to face opposite directions. The first camera can be rear-facing and the second camera can be front-facing, for example.

At step 502, a plurality of images that represent a first scene-to-be-captured is generated using a first camera on a mobile device. For example, a rear-facing camera of the mobile device upon which the user interface 402 is displayed captures a plurality of images while the rear-facing camera is engaged.

At step 504, the plurality of images that represent the first scene-to-be-captured is provided for display on the mobile device. For instance, a plurality of images is displayed in the user interface 402 while the rear-facing camera of the mobile device is engaged, to provide a live view of camera-captured images to the user.

At step 506, a first input to capture a first scene is received at the mobile device. For example, the user selects the capture button 408.

At step 508, a first image is generated using the first camera. For example, the rear-facing camera generates the first image 412.

At step 510, after capturing the first image, a plurality of images that represent a second scene-to-be-captured is generated using a second camera on the mobile device. For example, a front-facing camera of the mobile device upon which the user interface 404 is displayed captures a plurality of images while the front-facing camera is engaged.

At step 512, the plurality of images that represent the second scene-to-be-captured is provided for display on the mobile device. For example, the plurality of images that represent the second scene-to-be-captured is presented within the shape frame 414, to provide a live view to the user of images being captured by the front-facing camera.

At step 514, a second input to capture a second scene is received at the mobile device. For example, the user selects a capture button similar to the capture button 408.

At step 516, a second image is generated using the second camera. For example, the second image 416 is generated.

At step 518, a composite image including the first image and the second image is generated. At least a portion of the second image is provided over at least a portion of the first image. For example, the composite image 418 is generated. The composite image can include the second image provided within the first image (e.g., an image within an image, or "photo-in-photo"). The composite image can be automatically generated without user input after capturing the second image. Generating the composite image can include automatically determining a size of the second image, automatically determining a location for the second image on the first image, sizing the second image according to the determined size, and placing the sized second image at the determined location on the first image. The second image can be cropped. For example, the second image can be cropped into a predetermined shape. For instance, the second image can be provided in a shape frame that at least partially overlays the first image.

Figure 6A:
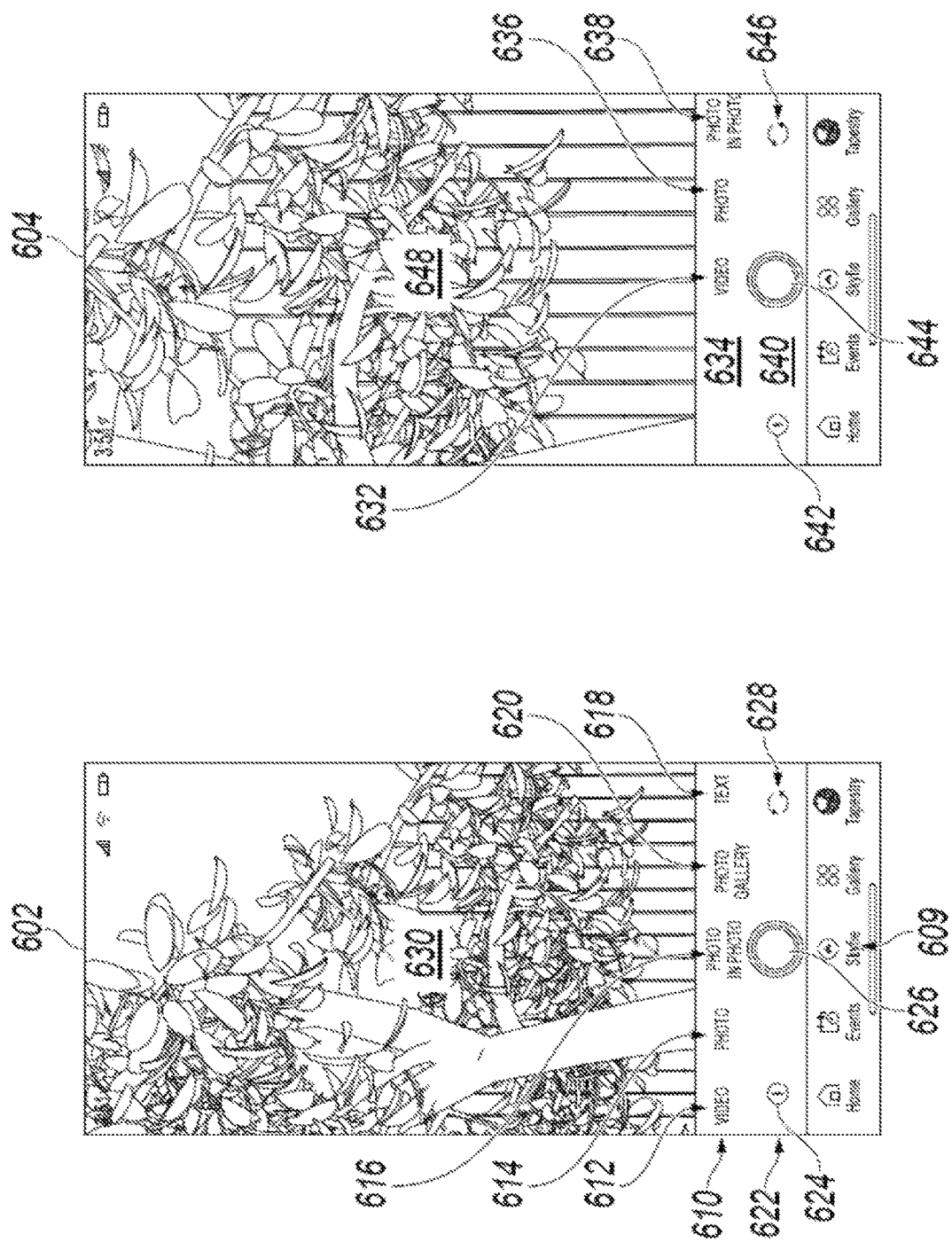
FIGS. 6A and 6B illustrate different states of a single-page user interface that can be used for generating different types of content.
Figure 6B:
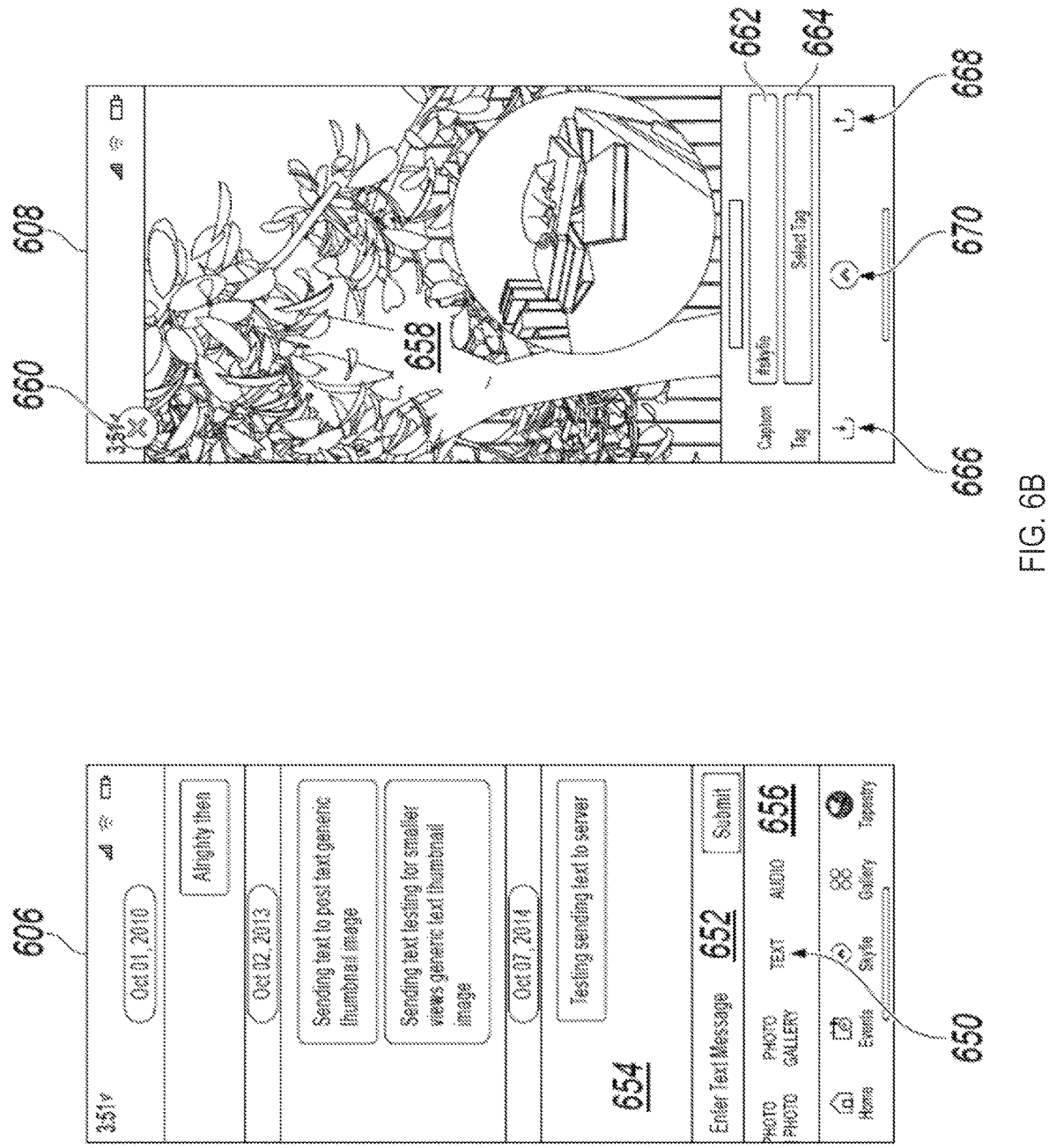

FIGS. 6A and 6B illustrate different states 602, 604, 606, and 608 of a single-page user interface that can be used for generating different types of content. In a first state 602, a single-page user interface is displayed. The single-page user interface can be displayed, for example, in response to selection of a single-page content creation control 609. In the first state 602, a content-creation menu 610 is displayed, in the single-page user interface, that includes options for content creation of various types of content. Content type options can include a video option 612, an image option 614, a composite content option 616 (e.g., photo-in-photo), and a text option 618. Other content type options, such as audio (not shown), can be accessed by scrolling the content-creation menu 610 horizontally. The single-page user interface can be upgraded to support creation of additional types of content. Content types of various sizes can be supported.

In some implementations, the content-creation menu 610 enables a user to select previously-created content (e.g., using a photo gallery option 620). A previously-created content item can be selected, for example, to share or upload the previously-created content item, to transfer the previously-created content item to a multimedia gallery used by the single-page user interface, or to merge the previously-created content item with a content item that is created using the single-page user interface. Previously-created content items can be associated with captions and/or tags when shared or uploaded, which can enable a user to later retrieve either previously-generated content or content created with the single-page user interface with single query. In some implementations, a first user can select a previously-created content item that was created by a second user, and edit the content item as part of a co-creation process. In some implementations, simultaneous co-editing of a same content item is supported.

The user can select a content type to create from the content-creation menu 610 (e.g., by selecting the video option 612, the image option 614, the composite content option 616, the text option 618, an audio option, or another type of option displayed in the content-creation menu 610). For instance, in the first state 602, the user has selected the composite content option 616. The composite content option 616 can be displayed in a different style (e.g., different color) from other options in the content-creation menu 610 as an indication that the composite content option 616 has been selected.

After a content creation option has been selected in the content-creation menu 610, a content-creation controls area 622 can display user interface controls that are specific to the type of content being created. For instance, the content-creation controls area 622 includes a camera flash option 624, an image capture control 626, and a camera selection control 628 (e.g., for switching between a front-facing and rear-facing camera). The camera flash option 624, the image capture control 626, and the camera selection control 628 are relevant to the selected composite content option 616. For instance, the composite content option 616 can be for generating a composite image, and a first step in creation of a composite image can be a capturing of a first image. For instance, the user can select the camera flash option 624 and/or the camera selection control 628, and then select the image capture control 626 to generate the first image of the composite image content.

Selection of the image capture control 626 can result in capture of a scene that is displayed in a content-creation area 630. The content-creation area 630 can change based on a type of content-creation option that is selected. Currently, the content-creation area 630 is displaying a live view of images being captured by a camera (e.g., a default camera or a camera that has been selected in response to user selection of the camera selection control 628). The content-creation area 630 can display a live camera view, in response to selection of the composite content option 616.

The content-creation menu 610 remains displayed even if the user switches between content creation options. For instance, as shown in a second state 604, the user has selected a video content option 632 (e.g., corresponding to the video content option 612). A content-creation menu 634 (e.g., corresponding to the content-creation menu 610) is displayed, in the second state 604. The content-creation menu 634 illustrates a scrolling of the content-creation menu 610, in response to user selection of the video content option 632. The user can subsequently select other content options, from the content-creation menu 634 (e.g., an image content option 636 (corresponding to the image option 614), a composite content option 638 (corresponding to the composite content option 616), or another content option (e.g., after scrolling the content-creation menu 634).

In response to selection of the video content option 632, a content-creation controls area 640 (e.g., corresponding to the content-creation controls area 622) is updated, to display controls that are relevant to the selected video content option 632 (e.g., relevant to video creation). For instance, the content-creation controls area 640 includes a camera flash option 642 (e.g., similar to the camera flash option 624), a start-video-recording button 644, and a camera selection control 646 (e.g., similar to the camera selection control 628).

A content-creation area 648 displays video currently being captured by a selected camera (e.g., as a live view). Video recording can begin in response to selection of the start-video-recording button 644. After being selected, the start-video-recording button 644 can change to a stop-video-recording button, which can be selected to stop recording of the video being displayed in the content-creation area 648.

As another example and as shown in a third state 606, the user has selected a text option 650 (e.g., corresponding to the text option 618). A text-creation area 652 is displayed that enables the user to enter text content. An entered-text area 654 displays text that has been entered during the text-creation process. As before, a content-creation menu 656 is displayed that enables a user to select another content type.

A fourth state 608 illustrates a content review interface 658. The content-review interface 658 can be displayed after a user has completed a content-creation process for a particular content type. For instance, the content-review interface 658 currently displays a composite image that was created, for example, after the user selected a composite content option (e.g., the composite content option 616), and completed the prompted steps for creation of the composite content. If the user is not satisfied with the created content, the user can discard the content by selecting a discard option 660.

If the user is satisfied with the created content, the user can optionally associate a caption and/or tag(s) with the content using a caption area 662 and/or a tag area 664, respectively. Captions and/or tags can enable a user to later retrieve either previously-generated content or content created with the single-page user interface with single query.

After a content item is generated, the content item can be saved (e.g., to a local gallery on the mobile device) in response to selection of a save item 666. As another example, the generated content item can be shared, with one or more applications on the mobile device, in response to selection of a share item 668. As yet another example, the generated content item can be uploaded (e.g., to an online gallery or online community), in response to selection of an upload item 670. In some implementations, multiple created content items (e.g., created by a same user or different users) can be merged, and a merged content item can be saved, shared and/or uploaded.

Figure 7:
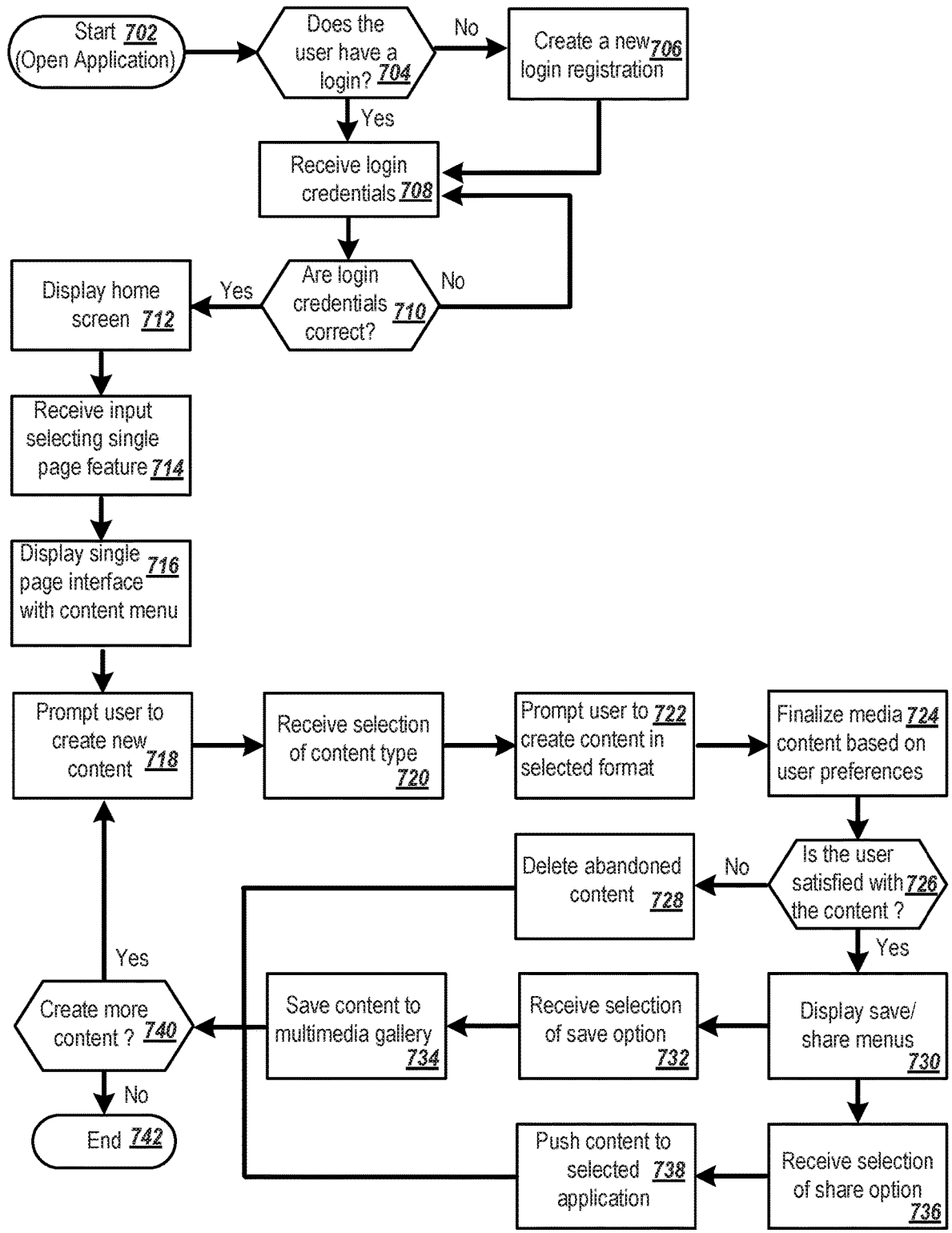
FIGS. 7 is a flow chart of a method for generation of content.

FIG. 7 is a flow chart of a method 700 for generating content. At step 702, the process 700 is started, for example, when a user opens a content-generation application. The user can open a content-generation application that includes a single-page user interface for generation of different types of content, for example.

At step 704, a determination is made as to whether the user has a login.

For example, the user may indicate that he or she does not have a login by selecting a "sign up" link or similar item on a login user interface. At step 706, a new login registration can be created for the user.

As another example, the user may indicate that he or she has a login by selecting a login link, or by entering credentials on the login user interface.

At step 708, login credentials are received (e.g., either credentials associated with the login registration created at step 706 or credentials previously established with an earlier login registration.

At step 710, a determination is made as to whether the received login credentials are valid. If the received login credentials are not valid, the user may reattempt a login, and updated login credentials can be received (e.g., at 708), and a re-determination of whether the updated login credentials are correct can be performed.

At step 712, in response to determining that the received login credentials are correct, a home screen of the application is displayed. The home screen of the application can include an option for displaying a single-page content creation interface.

At step 714, an input selecting a single-page content-creation feature is received. For example, an input selecting the single-page content creation control 609 is received.

At step 716, a single-page content creation interface is displayed, in response to the user input. For example, the first state 602 of the single-page user interface is displayed.

At step 718, the user is prompted to create new content. For instance, the content-creation menu 610 is displayed. In general, multiple selectable items, each corresponding to a particular type of content can be presented. Supported content types to create can include, for example, video, image, composite content (e.g., composite image), audio, and text. Other content types are possible.

At step 720, a selection of a particular content type to create is received. For example, selection of the composite content option 616 is received.

At step 722, one or more prompts are displayed, prompting the user to create content in the selected format. For instance, the text-creation area 652 is displayed. For some content types, prompts can correspond to user interface controls that provide options for creating content of a particular type. For instance, the camera flash option 624, the image capture control 626, and the camera selection control 628 are displayed in response to selection of the composite content option 616.

At step 724, media content is finalized based on user input received after the prompts are displayed and/or based on user preferences. For instance, generation of the composite image displayed in the content review area 658 is completed.

At step 726, a determination is made as to whether the user is satisfied with the created content. For example, a user input to delete the created content can be received, as an indication that the user is not satisfied with the created content. For instance, selection of the discard option 660 is received.

At step 728, the content (now deemed to be abandoned) can be deleted. For instance, in response to receiving selection of the discard option, the composite image being displayed in the content review area 658 is deleted.

At step 730 in response to determining that the user is satisfied with created content, one or both of save/share menus are displayed. For instance, the save item 666 and the share item 668 are displayed.

At step 732, selection of a save option is received. For instance, selection of the save item 666 is received.

At step 734, in response to receiving selection of the save option, the content is saved to a multimedia gallery that can store multiple types of content, such as images, audio, video, or text. For instance, in response to receiving selection of the save item 666, the composite image being displayed in the content review area 658 is saved to a local gallery on the mobile device.

At step 736, selection of a share option is received. For instance, selection of the share item 668 is received.

At step 738, in response to receiving selection of the share option, the created content is pushed (e.g., shared) to one or more selected applications. For instance, in response to receiving selection of the share item 668, the composite image being displayed in the content review area 658 is shared to one or more applications on the mobile device.

At step 740, a determination is made as to whether the user wants to create more content. A determination can be made that the user does not want to create more content, for example, based on a user closing the application. The user can indicate, in other ways, that they do not want to create more content (at least at the current time). For instance, the user may be presented a specific prompt that asks them if they want to create more content, and the user can respond to that prompt. As another example, the user may navigate to another area of the application that is not directly related to creating content.

At step 742, in response to determining that the user does not want to create more content, the process 700 ends. In response to determining that the user does want to create more content (e.g., based on the user continuing to use the application), the user is prompted to create new content (e.g., at 718). For instance, the content-creation menu 610 is displayed (e.g., after completion of a content review process or after a user has discarded content being reviewed).

Figure 8:
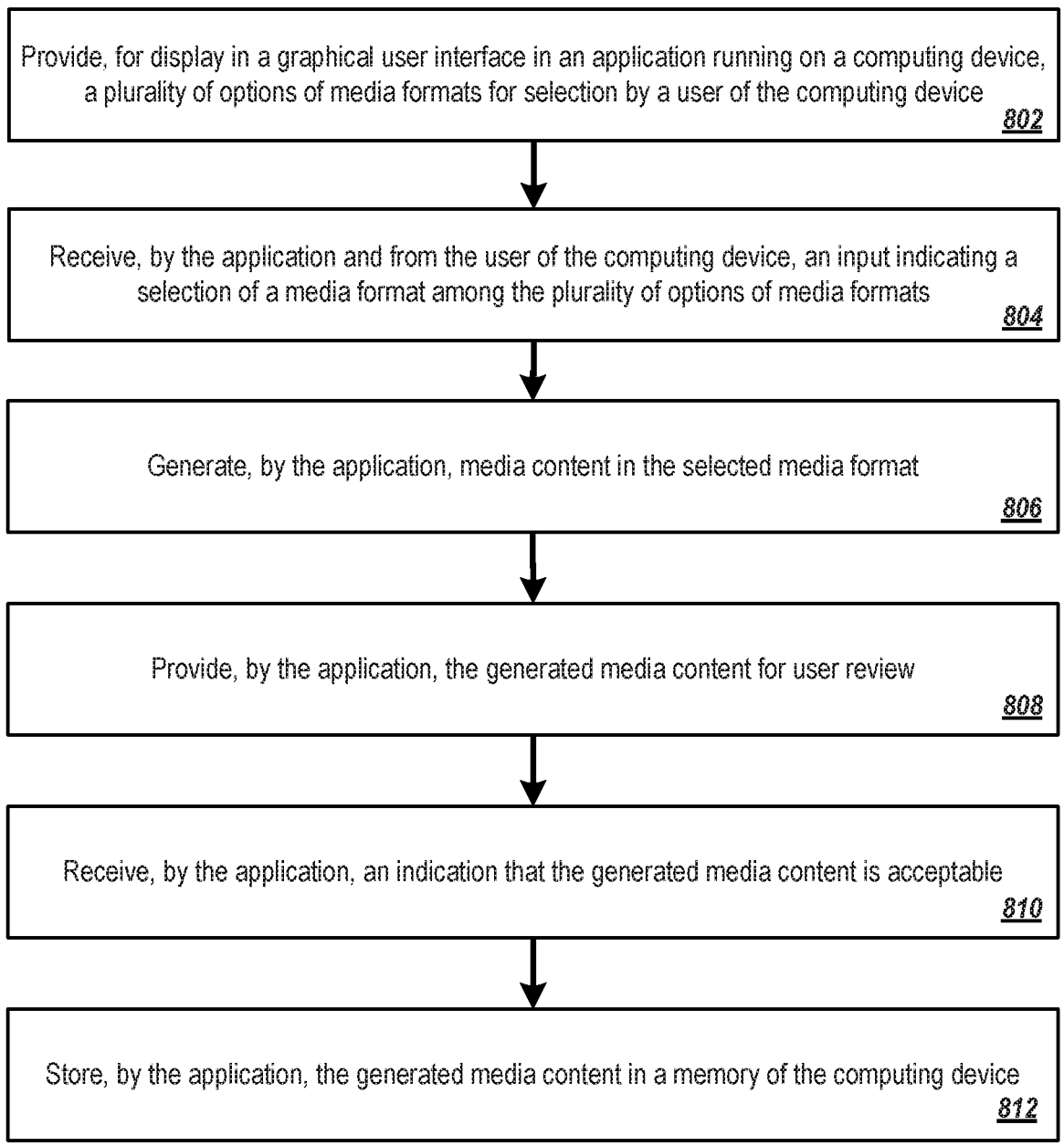
FIG. 8 is a flow chart of a method for generation of content.

FIG. 8 is a flow chart of a method 800 for generating content. For example, the process 800 may be used by the system 200 shown in FIG. 2 or some other system.

At step 802, a plurality of options of media formats for selection by a user of a computing device is provided, for display in a graphical user interface in an application running on the computing device. For instance, the content-creation menu 610 is displayed. The plurality of options of media formats for selection includes a composite photo. The plurality of options of media formats for selection can also include photo, video, audio, and text.

At step 804, an input indicating a selection of a media format among the plurality of options of media formats is received by the application and from the user of the computing device. For instance, selection of the composite image option 616 is received.

At step 806, media content in the selected media format is generated by the application. For instance, in response to user selection of controls in the content-creation controls area 622, a composite image is generated.

At step 808, the generated media content is provided, by the application, for user review. For instance, the composite image is displayed in the content review area 658.

At step 810, an indication that the generated media content is acceptable is received by the application. For instance, selection of the save item 666 is received. As another example, an indication to share the generated media content with one or more other applications running on the computing device can be received by the application and from the user of the computing device. For instance, selection of the share item 668 is received. In response to receiving the indication to share the generated media content, the generated media content can be shared with the one or more other applications.

At step 812, the generated media content is stored, by the application, in a memory of the computing device. The memory is associated with the application. The generated media content can be stored in a particular content gallery. For example, the user can select a particular content gallery for storage of the generated media content.

As another example, in response to receiving an indication that the generated media content is not acceptable, the generated media content can be deleted. After deleting the generated media content, the user can be prompted to select a second media format among the plurality of options of media formats and a second media content can be generated in the selected second media format.

Figure 9:
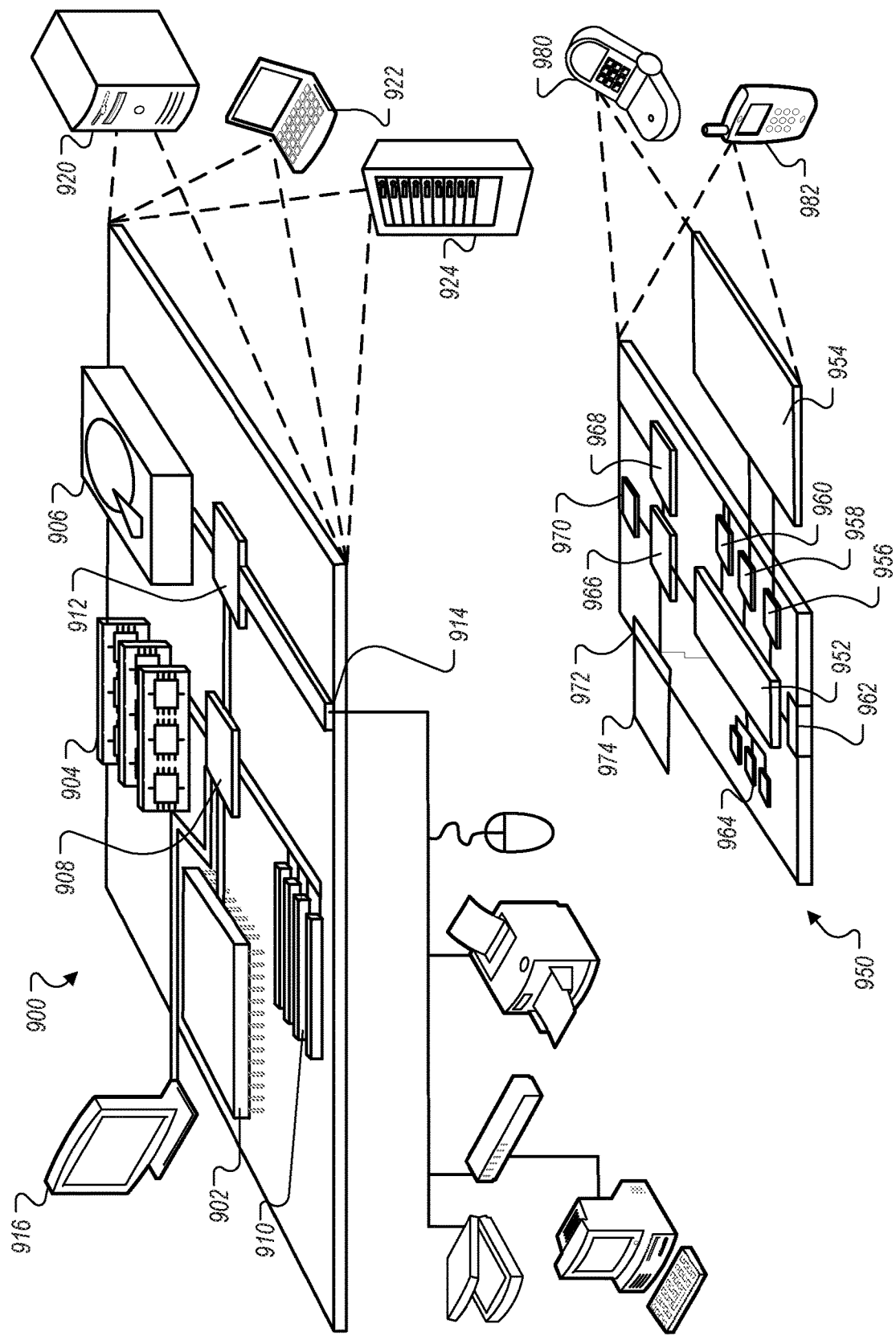
FIG. 9 shows an example of a computer device and a mobile computer device that can be used to implement the techniques described herein.

FIG. 9 shows an example of a computer device 900 and a mobile computer device 950 that can be used to implement the techniques described here. The computing device 900 is intended to represent various forms of digital computers, such as laptops, desktops, workstations, smart televisions, personal digital assistants, servers, blade servers, mainframes, and other appropriate computers. The mobile computing device 950 is intended to represent various forms of mobile devices, such as personal digital assistants, tablet computers, cellular telephones, smart-phones, and other similar computing devices. The components shown here, their connections and relationships, and their functions, are meant to be examples only, and are not meant to be limiting.

The computing device 900 includes a processor 902, a memory 909, a storage device 906, a high-speed interface 908 connecting to the memory 909 and multiple high-speed expansion ports 910, and a low-speed interface 912 connecting to a low-speed expansion port 919 and the storage device 906. Each of the processor 902, the memory 909, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 909 or on the storage device 906 to display graphical information for a graphical user interface (GUI) on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 909 stores information within the computing device 900. In some implementations, the memory 909 is a volatile memory unit or units. In some implementations, the memory 909 is a non-volatile memory unit or units. The memory 909 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 909, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 909, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 919. The low-speed expansion port 919, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 929. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 969, an input/output device such as a display 959, a communication interface 966, and a transceiver 968, among other components. The mobile computing device 950 may also be provided with a storage device, such as a micro-drive or other device, to provide additional storage. Each of the processor 952, the memory 969, the display 959, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 969. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 959. The display 959 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 959 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 969 stores information within the mobile computing device 950. The memory 969 can be implemented as one or more of a computer-readable medium or media, a volatile memory unit or units, or a non-volatile memory unit or units. An expansion memory 979 may also be provided and connected to the mobile computing device 950 through an expansion interface 972, which may include, for example, a SIMM (Single In Line Memory Module) card interface. The expansion memory 979 may provide extra storage space for the mobile computing device 950, or may also store applications or other information for the mobile computing device 950. Specifically, the expansion memory 979 may include instructions to carry out or supplement the processes described above, and may include secure information also. Thus, for example, the expansion memory 979 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 952), perform one or more methods, such as those described above. The instructions can also be stored by one or more storage devices, such as one or more computer- or machine-readable mediums (for example, the memory 969, the expansion memory 979, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube), LCD (liquid crystal display), or TFT monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The preceding figures and accompanying description illustrate example processes and computer-implementable techniques. However, system 200 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for generating composite content, the method comprising:
generating, using a first camera on a mobile device, a plurality of images that represent a first scene-to-be-captured;
providing, for display on the mobile device, the plurality of images that represent the first scene-to-be-captured;
receiving, at the mobile device, a first input to capture a first scene;
generating, using the first camera, a first image;
after capturing the first image, automatically and without user input, generating, using a second camera on the mobile device, a plurality of images that represent a second scene-to- captured;
providing, for display on the mobile device, the plurality of images that represent the second scene-to-be-captured;
receiving, at the mobile device, a second input to capture a second scene;
generating, using the second camera, a second image; and
generating a composite image comprising the first image and the second image, wherein at least a portion of the second image is provided over at least a portion of the first image, and wherein generating the composite image comprises:
automatically determining a size of the second image, based on the content of the first image;
automatically determining a location for the second image on the first image by detecting a color pattern in the content of the first image;
sizing the second image according to the determined size;
placing the sized second image at the determined location on the first image;
automatically determining a frame shape type for displaying the second image, based on a shape of the detected color pattern; and
cropping the second image to fit within the frame shape type.

2. The computer-implemented method of claim 1, wherein the first camera and the second camera are positioned on the mobile device to face opposite directions.

3. The computer-implemented method of claim 1, wherein the first camera is rear-facing.

4. The computer-implemented method of claim 1, wherein the second camera is front-facing.

5. The computer-implemented method of claim 1, wherein the composite image includes the second image provided within the first image.

6. The computer-implemented method of claim 1, wherein the composite image is automatically generated without user input after capturing the second image.

7. The computer-implemented method of claim 1, wherein generating the composite image further comprises cropping the second image.

8. The computer-implemented method of claim 7, wherein cropping the second image comprises cropping the second image into a predetermined shape.

9. A system comprising:
a memory storing instructions;
a first camera;
a second camera;
a display device; and
at least one hardware processor interoperably coupled with the memory, wherein the instructions instruct the at least one hardware processor to:
generate, using the first camera, a plurality of images that represent a first scene-to-be-captured;
provide, for display on the display device, the plurality of images that represent the first scene-to-be-captured;
receive a first input to capture a first scene;
generate, using the first camera, a first image;
after capturing the first image, automatically and without user input, generate, using the second camera, a plurality of images that represent a second scene-to-be-captured;
provide, for display on the display device, the plurality of images that represent the second scene-to-be-captured;
receive a second input to capture a second scene;
generate, using the second camera, a second image; and
generate a composite image comprising the first image and the second image, wherein at least a portion of the second image is provided over at least a portion of the first image, and wherein generating the composite image comprises:
automatically determining a size of the second image, based on the content of the first image;
automatically determining a location for the second image on the first image by detecting a color pattern in the content of the first image;
sizing the second image according to the determined size;
placing the sized second image at the determined location on the first image;
automatically determining a frame shape type for displaying the second image, based on a shape of the detected color pattern; and
cropping the second image to fit within the frame shape type.

10. The system of claim 9, wherein the first camera and the second camera are positioned on the mobile device to face opposite directions.

11. The system of claim 9, wherein the first camera is rear-facing.

12. The system of claim 9, wherein the second camera is front-facing.

13. The system of claim 9, wherein the composite image includes the second image provided within the first image.

14. The computer-implemented method of claim 1, wherein automatically determining a location for the second image on the first image by detecting a color pattern in the content of the first image comprises detecting an area of the first image that includes pixels that are substantially uniform in color.

15. The computer-implemented method of claim 1, wherein automatically determining a location for the second image on the first image by detecting a color pattern in the content of the first image comprises:
identifying an area of the first image that includes a repeating pattern of repeated objects; and
determining, as the location for the second image, a portion of the area that includes the repeating pattern of repeated objects.

* * * * *